US009127883B2

(12) United States Patent
Lindig et al.

(10) Patent No.: US 9,127,883 B2
(45) Date of Patent: Sep. 8, 2015

(54) DEVICE FOR DRYING AND PREHEATING PARTICULATE FEEDSTOCK

(75) Inventors: Matthias Lindig, Ingelheim (DE); Alexander Sorg, Aschaffenburg (DE)

(73) Assignee: Beteiligungen Sorg GmbH & Co. KG, Lohr am Main (DE)

( * ) Notice: Subject to any disclaimer, the term of this patent is extended or adjusted under 35 U.S.C. 154(b) by 192 days.

(21) Appl. No.: 13/581,865

(22) PCT Filed: Jun. 7, 2011

(86) PCT No.: PCT/EP2011/002772
§ 371 (c)(1),
(2), (4) Date: Aug. 30, 2012

(87) PCT Pub. No.: WO2012/000601
PCT Pub. Date: Jan. 5, 2012

(65) Prior Publication Data
US 2013/0091721 A1    Apr. 18, 2013

(30) Foreign Application Priority Data
Jun. 28, 2010   (DE) .......................... 10 2010 025 365

(51) Int. Cl.
*F26B 21/00*   (2006.01)
*F28C 3/14*    (2006.01)
(Continued)

(52) U.S. Cl.
CPC ................. *F26B 21/00* (2013.01); *C03B 3/023* (2013.01); *F26B 17/1416* (2013.01);
(Continued)

(58) Field of Classification Search
CPC .. F26B 21/00; F26B 17/1416; F26B 17/1475; F26B 23/001; F26B 2200/08; C03B 3/0023; F28C 3/14; F28D 7/1623; F28D 2021/0045

USPC ........ 432/95, 96; 34/164, 165, 168, 171, 178, 34/188
See application file for complete search history.

(56) References Cited

U.S. PATENT DOCUMENTS 3,172,648 A    3/1965   Brichard
4,797,092 A    1/1989   Pieper
(Continued)

FOREIGN PATENT DOCUMENTS

DE    1235528      3/1967
DE    19728332     1/1999
DE    19829644     4/2000
(Continued)

OTHER PUBLICATIONS

International Preliminary Report on Patentability, Jan. 10, 2013.

*Primary Examiner* — Jiping Lu
(74) *Attorney, Agent, or Firm* — Greer, Burns & Crain Ltd.

(57) ABSTRACT

A device for drying and preheating particulate feedstock for glass melting apparatuses including a vertical shaft in which a plurality of gas guides are arranged level by level. The shaft has at least one gas channel for exhaust gases from the melting apparatus. a) feedstock guide elements are arranged one above another within the shaft with lateral spacings on all sides, with a portion of the gas guides extending through the guide elements, b) at least one of the guide elements is mounted in a transversely movable fashion with respect to the shaft independently of other guide elements, c) the guide elements are provided with converging oblique surfaces for introducing the feedstock at upper ends of the guide elements and with converging oblique surfaces for the emergence of the feedstock at lower ends of the guide elements, and d) at least one guide element is connected to a vibrating drive.

19 Claims, 3 Drawing Sheets

(51) Int. Cl.
  *F26B 17/14* (2006.01)
  *F26B 23/00* (2006.01)
  *F28D 7/16* (2006.01)
  *C03B 3/02* (2006.01)
  *F28D 21/00* (2006.01)

(52) U.S. Cl.
  CPC .......... *F26B 17/1475* (2013.01); *F26B 23/001* (2013.01); *F28C 3/14* (2013.01); *F28D 7/1623* (2013.01); *F26B 2200/08* (2013.01); *F28D 2021/0045* (2013.01)

(56) References Cited

U.S. PATENT DOCUMENTS 5,483,752 A  *  1/1996  Kreft et al. ............... 34/164
7,494,948 B2     2/2009  Stanley

FOREIGN PATENT DOCUMENTS

| DE | 102008030161 | 7/2009 |
| EP | 0255606 | 2/1988 |
| EP | 1123903 | 8/2001 |

* cited by examiner

DEVICE FOR DRYING AND PREHEATING PARTICULATE FEEDSTOCK

BACKGROUND OF THE INVENTION

The present invention relates to a device for drying and preheating particulate feedstock for glass melting installations having a vertical shaft in which a plurality of gas guides are configured in tiers, the shaft being provided with at least one gas channel for exhaust gases from the melt installation.

Reports concerning the preparation of feedstock for glass melting installations have been published for decades, in many cases addressing the tendency of mixtures having different components to become agglutinated. The mixtures are provided for glass melting for very different purposes. The causes of the tendency of the components to become agglutinated are manifold, and are due to their very different melting points, viscosities, particle sizes and shapes, and to thermal and mechanical influences on the transport path before the melting. Particularly disturbing here is free or bound water carried along in the feedstock, as well as water vapor introduced with the exhaust gases from the downstream melt tank for heating and heat recuperation. The condensation of evaporated water contributes enormously to the tendency towards agglutination. A further disturbing effect is a tower of feedstock that builds up, in an uncontrolled and non-uniform manner, above the uppermost heating lines, and in which water vapor in turn condenses.

From U.S. Pat. No. 7,494,948 B2, it is known either to store free-flowing feed quantities of glass components for glass melting ovens in the moist state at temperatures below 35° C. or to preheat them to temperatures of 100° C. or higher before supplying them to a glass melting oven. The moist feedstock should contain a free water portion of from 2% to 10% and a portion of from 0.0001% to 5% of a surface-active material, preferably a water-soluble soap such as a carboxylate having 4 to 22 bound C atoms. The moist feedstock can be stored and preheated to at least 150° C., and remains free-flowing without depositing. The author states that before this invention it was not possible to feed a preheater with moist feedstock because at temperatures of 100° C. and higher a baking together of the compound was unavoidable. The document says nothing about the particle size, but, referring to EP 11 23 903 A2, states that without a device described there having an electrostatic dust separator, fine dust particles caused environmental pollution.

From DE 10 2008 030 161 B3, a shaft-type heat exchanger is known for preheating particulate glass mixture for glass melting ovens, through which smoke gases from the oven heating are conducted in alternating and meandering horizontal smoke gas channels. The heat exchanger has numerous vertical melt material channels that are rectangular in cross-section and that intersect, staggered transversely, with the smoke gas channels and are connected to one another by openings in the channel walls in a manner intended to suction water vapor from the vertical melt material channels in the transverse direction and to prevent the entry of smoke gases into the melt material channels. However, it cannot be excluded that, due to the distances between the stated openings in the shaft walls and due to the long horizontal flow paths in the melt material, moisture will remain therein, causing agglutination of the particles of the melt material and blockage of the supply.

None of the named documents addresses the problem of keeping the feedstock inside the shaft in movement in such a way that an agglutination of the particles is prevented or interrupted and a tendency towards agglutination is counteracted.

Therefore, the present invention is based on the object of indicating a device by which the feedstock inside the shaft is kept in movement in such a way that an agglutination of the particles is prevented or interrupted and a tendency towards agglutination is counteracted.

SUMMARY OF THE INVENTION in the device indicated above, the stated object is achieved according to the present invention in that a) guide elements for the feedstock are situated one over the other in tiers inside the shaft, and with lateral distances at all sides, a part. of the gas guides being routed respectively through said elements, b) at least a part of the guide elements is mounted so as to be movable transversely relative to the shaft, independently of one another, c) the guide elements are provided at their upper ends with converging oblique surfaces for the introduction of the feedstock, and are provided at their lower ends with converging oblique surfaces for the exit of the feedstock, and d) at least one of the guide elements is connected to a vibrating drive, In way, the object stated above is reliably achieved, and a device is indicated by which the feedstock inside the shaft is kept in movement in such a way that an agglutination of the particles is prevented or interrupted and a tendency toward agglutination is counteracted.

In further embodiments of the present invention, it is particularly advantageous if, either individually or in combination:

the movable guide elements are suspended from pendulum braces at least three points of their circumference, at least a part of the pendulum braces is situated inside the shaft, between the shaft and the guide elements, the vibrating drive is connected by a horizontal connecting rod to the associated guide element, and the connecting rod is guided through a wall of the shaft, the connecting rod is suspended outside the shaft by a pendulum brace on the wall thereof, between the individual tiers (E1, E2, E3, E4), horizontal separating plates are situated on the greater part of the circumference of the shaft, said plates leaving open, at the open part of their circumference, a flow path for the heating gases, the flow paths are situated one over the other in alternating staggered fashion, the cross-section of the shaft is made rectangular, the connecting rods for the guide elements are connected to a mounting bracket that surrounds the shaft and the guide elements on opposite sides and is guided there by rollers, and/or the shaft, the guide elements, and the separating plates are situated in rectangular surfaces.

Exemplary embodiments of the subject matter of the present invention and their manner of operation, and further advantages, are explained in more detail in the following on the basis of schematized FIGS. 1 through 6.

DETAILED DESCRIPTION OF THE PREFERRED EMBODIMENTS

Figure 1:
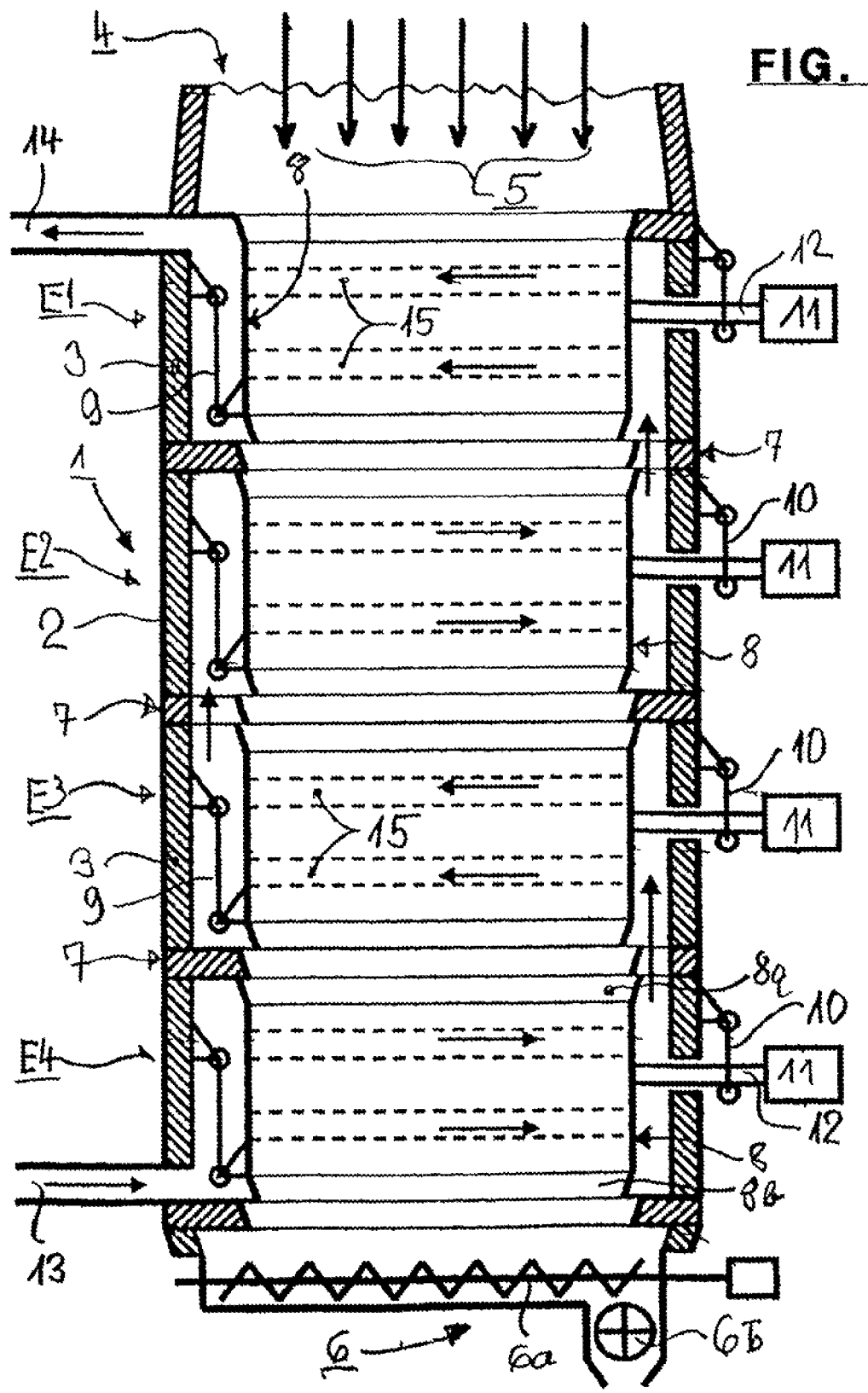
FIG. 1 shows a vertical section through a shaft having guide elements configured in tiers.

FIG. 1 shows a shaft 1 having a rectangular cross-section made up of a metallic cladding 2 with linings 3 made of heat insulating material. At the upper end, shall 1 has a feed opening 4 that is provided with feedstock 5 with as uniform a surface distribution as possible, indicated here by arrows. Feedstock 5 flows downward under the action of gravity. At the lower end, shaft 1 has a removal device 6 having a motor-driven conveying screw 6a and a dosing device 6b. In this way, the heated feedstock is supplied to a glass melting tank (not shown).

Figure 3:
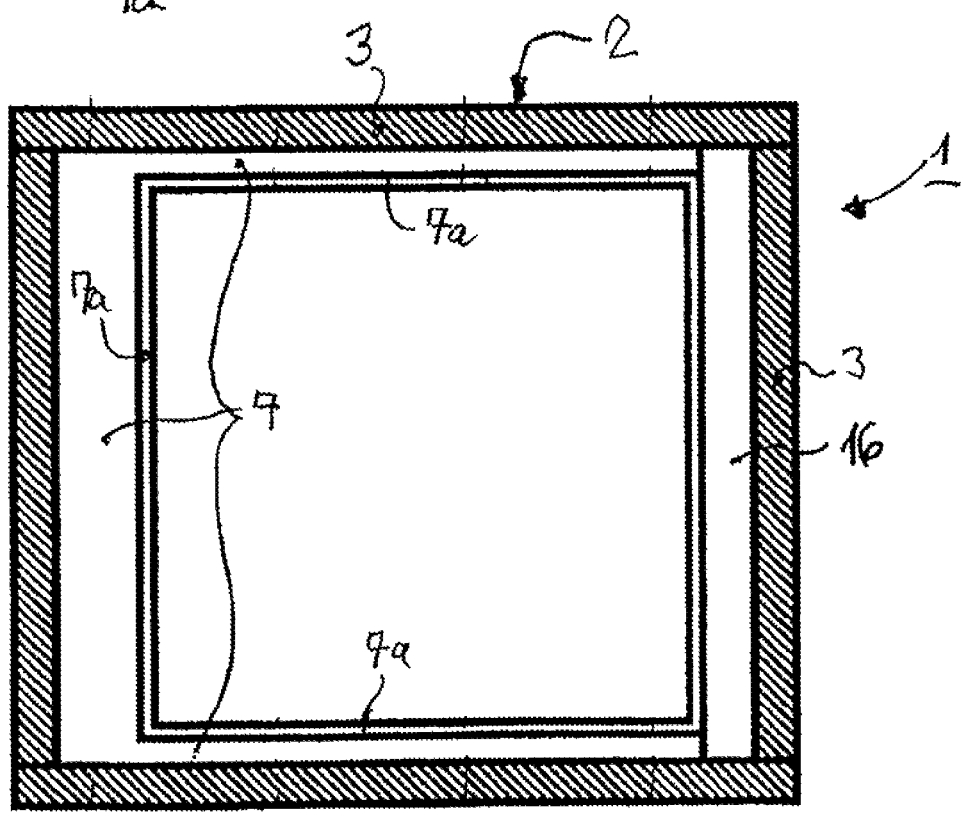
FIG. 3 shows a horizontal section through the shaft and a top view of one of the separating plates.

Linings 3 are situated one over the other in tiers and are separated by separating plates 7, of which FIG. 3 shows a top view, Within each tier (E1, E2, E3, and E4) there are situated, in a rectangular configuration, vertical frame-type guide elements 8 that have at their upper and lower edges downward-converging oblique surfaces 8a and 8b that form a continuous transport path for feedstock 5. Separating plates 7 are separated from guide elements 8 by movement gaps that are not particularly highlighted, so that these plates can execute horizontal transverse movements. For this purpose, frame-type guide elements 8 are suspended at least three points of their circumference either directly or indirectly on pendulum braces 9 and 10, and are connected to vibrating drives 11 that are connected to guide elements 8 via connecting rods 12. Vibrating drives 1 can have mechanical or electrical inner workings of known design, and may execute very different movement parameters with regard to frequencies, amplitudes, and directions so that encrustations between the particles of feedstock 5 are broken up in each case on the transport path.

FIG. 1 further shows that pendulum braces 9 are situated inside shaft 1 between cladding 3 thereof and a respective guide element 8, and pendulum braces 10 are situated outside shaft 1 between cladding 2 thereof and vibrating drives 11. Moreover, shaft 1 has at its lower end a gas channel 13 for the introduction of hot exhaust gases from the downstream melt tank and has at its upper end a gas channel 14 for conducting away exhaust gases to a chimney (not shown), for example via a cleaning device. The gas guides inside shaft 1 are indicated by arrows. For this purpose, guide elements 8 have, in each two tiers, horizontal continuous gas guides 15 that are shown in broken lines. With regard to the design of gas guides 15, the following is to be noted; in uppermost guide element 8, gas guides 15 should be realized as channels closed at their circumference, while in the tiers situated thereunder gas guides 15 may or should be realized as downwardly open channels, so that water vapor still exiting from the mixture can be carried away with the heating gas.

Figure 2:
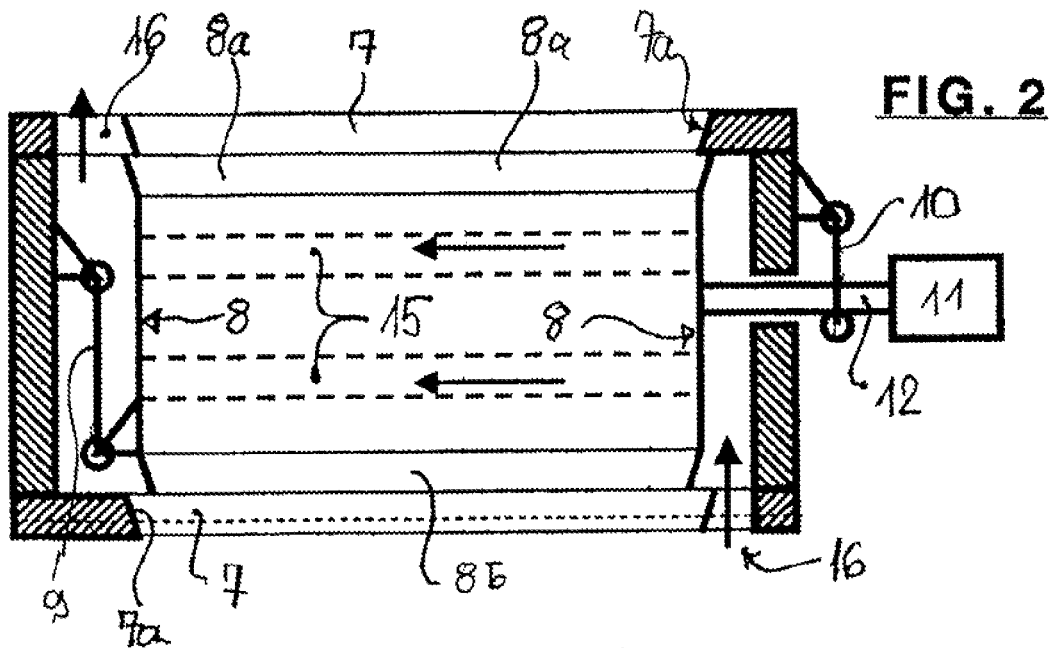
FIG. 2 shows a gas guide in a single tier through separating plates and gas paths.

As is also shown in FIG. 2, the heating gases flow in opposite directions in the tiers situated one over the other. This is achieved in that separating plates 7 shown in FIG. 3 are situated one over the other in alternating layers, in such a way that flow path 16 left open on a respective side enables a change of the flow directions of the heating gases.

FIG. 3 shows a cross-section through shaft 1 with its metallic cladding 2 and with insulating linings 3. Separating plate 7, shown here in atop view, has on three sides of its circumference horizontal separating surfaces, and also has on this circumference downward-converging oblique surfaces 7a. The fourth circumferential side is open, forming already-described flow path 16.

Figure 4:
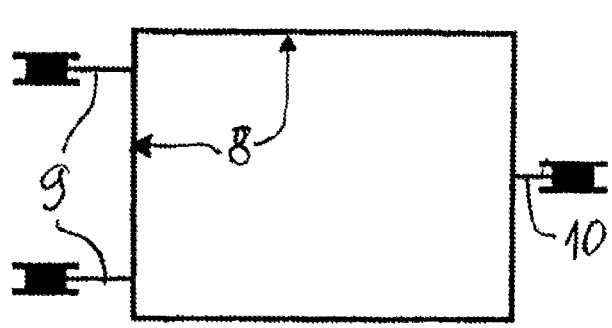
FIG. 4 shows a further schematized top view of a three-point bearing of one of the guide elements.
Figure 5:
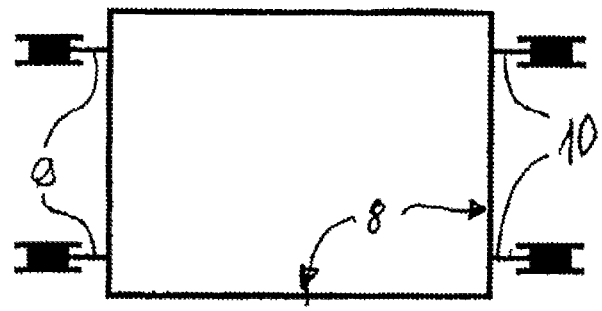
FIG. 5 shows a likewise further schematized top view of a four-point bearing of one of the guide elements.

FIG. 4 shows a further schematized top view of a three-point bearing of one of guide elements 8, and FIG. 5 shows a likewise further schematized top view of a four-point bearing of one of guide elements 8.

Figure 6:
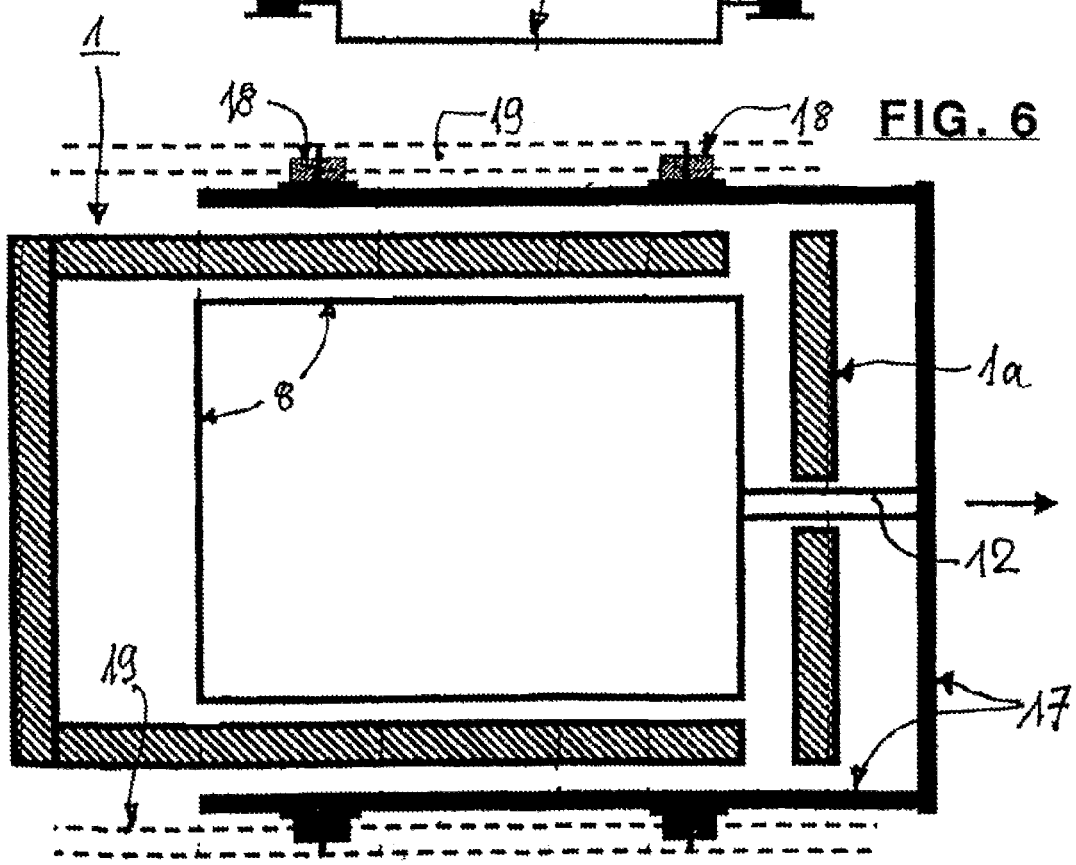
FIG. 6 shows a horizontal sectional representation analogous to FIG. 3, with a mounting bracket that externally surrounds the shaft on a four-point bearing, and having the additional possibility of extending the associated guide element out laterally with the opening of the shaft.

FIG. 6 shows a horizontal sectional view analogous to FIG. 3 with a warp-resistant mounting bracket 17 that externally surrounds shaft 1 on a four-point bearing and is capable of traveling on rails 19 with four driven rollers 18. In this way, it is not only possible for guide element 8 to execute an oscillatory or vibrating movement, but there is also the additional possibility of extending associated guide element 8 out laterally in order to open shaft 1. Here, a separated wall segment 1a of shaft 1 is carried along with this extension.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 shaft
1a wall segment
2 cladding
3 linings
4 feed opening
5 feedstock
6 removal device
6a conveyor screw
6b dosing device
7 separating plates
7a oblique surfaces
8 guide elements
8a oblique surfaces
8b oblique surfaces
9 pendulum braces
10 pendulum braces
11 vibrating drives
12 connecting rods
13 gas channel
14 gas channel
15 gas guides
16 flow path
17 mounting bracket
18 rollers
19 rails
E1, E2, E3, E4 tiers

The invention claimed is:
1. A device for drying and preheating particulate feedstock for glass melting installations, having a vertical shaft with a feed opening at an upper end, and at a lower end a removal device for the particulate feedstock, in which a plurality of gas guides are situated in tiers, the shaft being provided with at least one gas channel for the introduction of exhaust gases from the melt installation into the gas guides and a gas channel for conducting away exhaust gases from the gas guides, comprising:

a) frame-shaped guide elements for the feedstock situated one over the other in tiers inside the shaft, and with lateral distances at all sides, a part of the gas guides being routed respectively through said elements, b) at least some of the guide elements being mounted so as to be movable transversely relative to the shaft, independently of one another, c) the guide elements being provided at their upper ends with converging oblique surfaces for the introduction of the feedstock, and being provided at their lower ends with converging oblique surfaces for the exit of the feedstock, and d) at least a part of one of the guide elements being connected to a vibrating drive.

2. The device of claim 1, wherein the movable guide elements are suspended on pendulum braces at at least three points of their circumference.

3. The device of claim 2, wherein at least a part of the pendulum braces is situated inside the shaft, between the shaft and the guide elements.

4. The device of claim 2, wherein the vibrating drive is connected to the associated guide element by a horizontal connecting rod, and the connecting rod is guided through a wall of the shaft.

5. The device of claim 4, wherein the connecting rod is suspended outside the shaft on the wall thereof by a pendulum brace.

6. The device of claim 4, wherein the cross-section of the shaft is made rectangular, and the connecting rods for the guide elements are connected to a mounting bracket that surrounds the shaft and the guide elements on opposite sides and is guided there by rollers.

7. The device of claim 1, wherein between the individual tiers, horizontal separating plates are situated on the greater part of the circumference of the shaft, said plates leaving open, at an open part of their circumference, a flow path for the heating gases.

8. The device of claim 7, wherein the flow paths are situated one over the other so as to be staggered in alternating fashion.

9. The device of claim 1, wherein the shaft, the guide elements, and the separating plates are situated in rectangular surfaces.

10. A device for drying and preheating particulate feedstock for a glass melting installation, comprising:

a vertical shaft defined by one or more vertical walls with a feed opening at an upper end, and at a lower end a removal device for the particulate feedstock, frame-shaped guide elements for the feedstock vertically arranged one above the other within the shaft in tiers, the guide elements being laterally spaced from the one or more vertical walls of the shaft at all sides of the guide elements, a plurality of gas guides vertically arranged within the shaft in tiers, at least some of the gas guides being routed through the guide elements, at least one gas channel provided within the shaft for the introduction of exhaust gases from the melt installation into the gas guides and a gas channel for conducting exhaust gases away from the gas guides, at least some of the guide elements being mounted so as to be movable transversely relative to the shaft, independently of one another, and at least a part of one of the guide elements being connected to a vibrating drive.

11. A device according to claim 10, wherein the guide elements are provided at their upper ends with converging oblique surfaces for the introduction of the feedstock, and being provided at their lower ends with converging oblique surfaces for the exit of the feedstock.

12. The device of claim 10, wherein the movable guide elements are suspended on pendulum braces located at least three points of the circumference of the guide elements.

13. The device of claim 12, wherein at least some of the pendulum braces are situated inside the shaft, between the one or more walls of the shaft and the guide elements.

14. The device of claim 12, wherein the vibrating drive is connected to an associated guide element by a horizontal connecting rod, and the connecting rod is guided through one of the one or more walls of the shaft.

15. The device of claim 14, wherein the connecting rod is suspended outside the shaft on the one of the one or more walls thereof by a pendulum brace.

16. The device of claim 14, wherein the cross-section of the shaft is rectangular, and the connecting rod for the guide element is connected to project inwardly of a mounting bracket that surrounds a portion of the circumference of the shaft, the guide element being guided for movement by rollers.

17. The device of claim 10, wherein horizontal separating plates are situated between the individual tiers, the plates having a circumference which engages with the one or more walls of the shaft along a majority of an inner circumference of the shaft and being spaced from the one or more walls of the shaft along a minority of the inner circumference, the plates defining a flow path for the heating gases along that portion of their circumference which is spaced from the one or more walls of the shaft.

18. The device of claim 17, wherein the flow paths are situated one over the other so as to be staggered in alternating fashion.

19. The device of claim 10, wherein the shaft, the guide elements, and the separating plates have rectangular horizontal cross sections.

* * * * *